United States Patent [19]

Lorch et al.

[11] 4,010,394
[45] * Mar. 1, 1977

[54] SUPPORT FOR AN END WINDING OF A ROTOR OF A DYNAMO-ELECTRIC MACHINE

[75] Inventors: Hugh Olaf Lorch; Albert Benjamin John Reece, both of Stafford, England

[73] Assignee: The English Electric Company Limited, London, England

[ * ] Notice: The portion of the term of this patent subsequent to Dec. 12, 1991, has been disclaimed.

[22] Filed: Dec. 12, 1974

[21] Appl. No.: 532,048

[30] Foreign Application Priority Data

Jan. 11, 1974 United Kingdom ............. 01358/74

[52] U.S. Cl. .................................. 310/194; 310/43; 310/61; 310/270

[51] Int. Cl.² ............................................ H02K 1/32

[58] Field of Search ............ 310/194, 52, 183, 55, 310/53, 265, 61, 271, 59, 65, 64, 42, 261, 262, 264, 43, 45; 29/598; 336/185, 208

[56] References Cited

UNITED STATES PATENTS

| | | | |
|---|---|---|---|
| 2,340,905 | 2/1944 | Sigmund | 310/43 UX |
| 2,750,523 | 6/1956 | Wiedemann | 310/183 |
| 2,896,100 | 7/1959 | Axelson | 310/271 |
| 3,189,769 | 6/1965 | Willyoung | 310/52 |
| 3,246,187 | 4/1966 | Iemura | 29/598 |
| 3,388,458 | 6/1968 | Logan | 310/43 |
| 3,487,243 | 12/1969 | Wiedemann | 310/54 |
| 3,497,736 | 2/1970 | Cuny | 310/65 |
| 3,543,062 | 11/1970 | Banchieri | 310/54 |
| 3,588,560 | 6/1971 | Akselsen | 310/214 |
| 3,634,709 | 1/1972 | LeHenaff | 310/271 |

Primary Examiner—R. Skudy
Attorney, Agent, or Firm—Kirschstein, Kirschstein, Ottinger & Frank

[57] ABSTRACT

A rotor of a dynamo-electric machine having the conductors forming an end-winding supported by an annular support arrangement interposed between an overhang region of the rotor body and the conductors forming the end winding. The annular support arrangement may comprise a single annular member or a plurality of separate members secured around the overhang region of the rotor body. The annular support arrangement may be formed from a non-magnetic metal of low density, for example, an aluminium alloy, or may be formed from a suitable insulating material, for example, a fibre reinforced composite material.

12 Claims, 12 Drawing Figures

SUPPORT FOR AN END WINDING OF A ROTOR OF A DYNAMO-ELECTRIC MACHINE

This invention relates to end-windings of rotors of dynamo-electric machines and has an important application to end-windings of "slot-less" rotors, that is to say rotors in which the main part of the magnetic flux is conducted into the body of the rotor without passing through integral magnetic teeth as in conventional rotors.

In both slot-less and conventional rotors the forces which act on the conductors forming the end-windings during use of the dynamo-electric machine can cause undesirable movement of these conductors.

It is an object of this invention to provide a rotor of a dynamo-electric machine in which the conductors forming the end-windings are supported to prevent such undesirable movement.

According to the present invention a rotor of a dynamo-electric machine has the conductors forming an end-winding supported by annular support means interposed between an overhang region of the rotor body and the conductors forming the end-winding.

Normally two such annular support means would be provided, one for each-winding of the rotor.

An annular support means may comprise a single annular member or may comprise a plurality of separate members secured around the overhang region of the rotor body.

Conveniently, the annular support means may be formed from a non-magnetic metal of low density, for example, an aluminium alloy.

Alternatively, the annular support means may be formed from a suitable electrical insulating material, for example, a fibre-reinforced composite material.

The conductors forming the end-winding may be constrained against the effects of centrifugal force by a plurality of annular members which encircle said conductors at spaced positions along the overhand region of the rotor body and are prestressed to clamp said conductors to the support means which surrounds the overhang region of the rotor body, so that no further stretching of the annular members occurs at the maximum speed of the rotor.

The annular members may be prestressed in situ on the rotor by at least one expansible device interposed between the annular members and the conductors forming the end-winding and then expanded to prestress the annular members.

One form of expansible device comprises an inflatable container into which is forced a fluid medium under pressure. For example, the fluid medium may be a suitable synthetic resin which can be pumped into the inflatable container under pressure and which can be cured so that it becomes solid while in the pressurized condition.

The axially extending portions of the conductors forming an end-winding may also be constrained against torque forces by a plurality of support members disposed axially along the annular support means and projecting from the periphery of the support means so that groups of axially extending conductors of the end-winding lie between two adjacent support members.

The invention will now be described, by way of example, with reference to the accompanying drawings in which.

Figure 1:
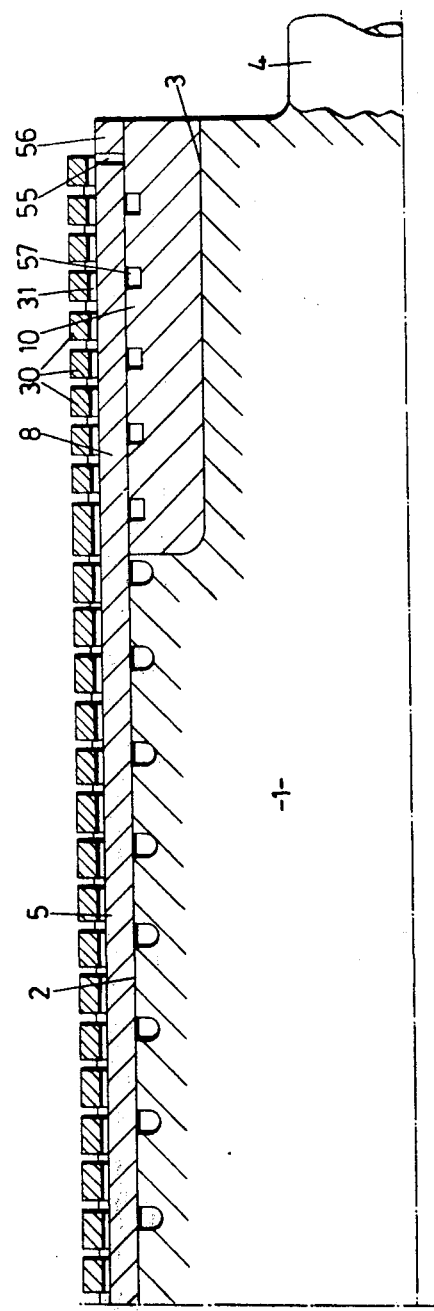
FIG. 1 is a longitudinal sectional elevation of part of a gas-cooled slot-less rotor having end-windings supported in accordance with the invention.

Referring in the first instance to FIGS. 1 to 6, the slot-less gas-cooled rotor comprises a cylindrical rotor body 1 having an active region 2 which lies within a stator (not shown) of a dynamo-electric macjhine, and has at each end, an overhang region 3 which has a diameter less than that of the active region 2 and terminates in a shaft 4. Conveniently, the rotor body 1 may be formed by a one-piece steel forging. The active region 2 is provided with a winding 5 which comprises a multiplicity of conductors extending axially along its periphery and occupying substantially one third of the circumference of the rotor body 1 at each end of the quadrature axis. The conductors forming the winding 5 may be constrained against the effects of centrifugal force in the manner described in our co-pending U.S. Pat. application Ser. No. 532,047 filed Dec. 12, 1974.

Figure 2:
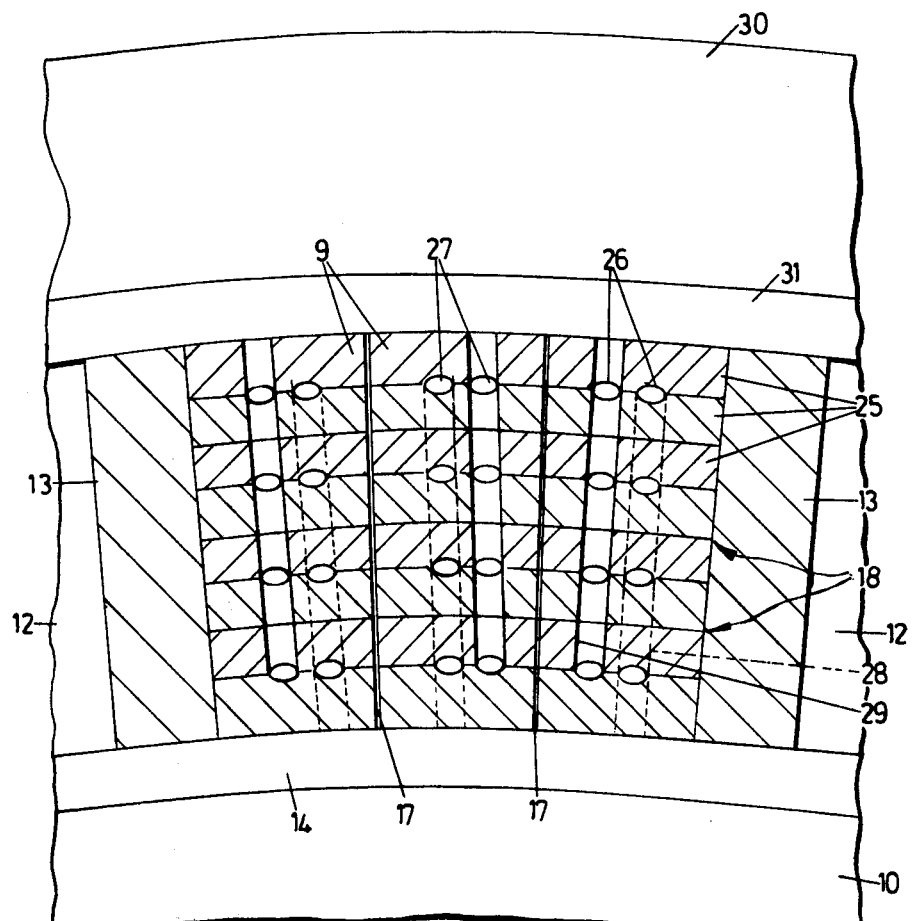
FIG. 2 is a fragmentary cross-section showing a group of axially extending conductors of an end-winding shown in FIG. 1, but drawn to a larger scale than that figure.
Figure 3:
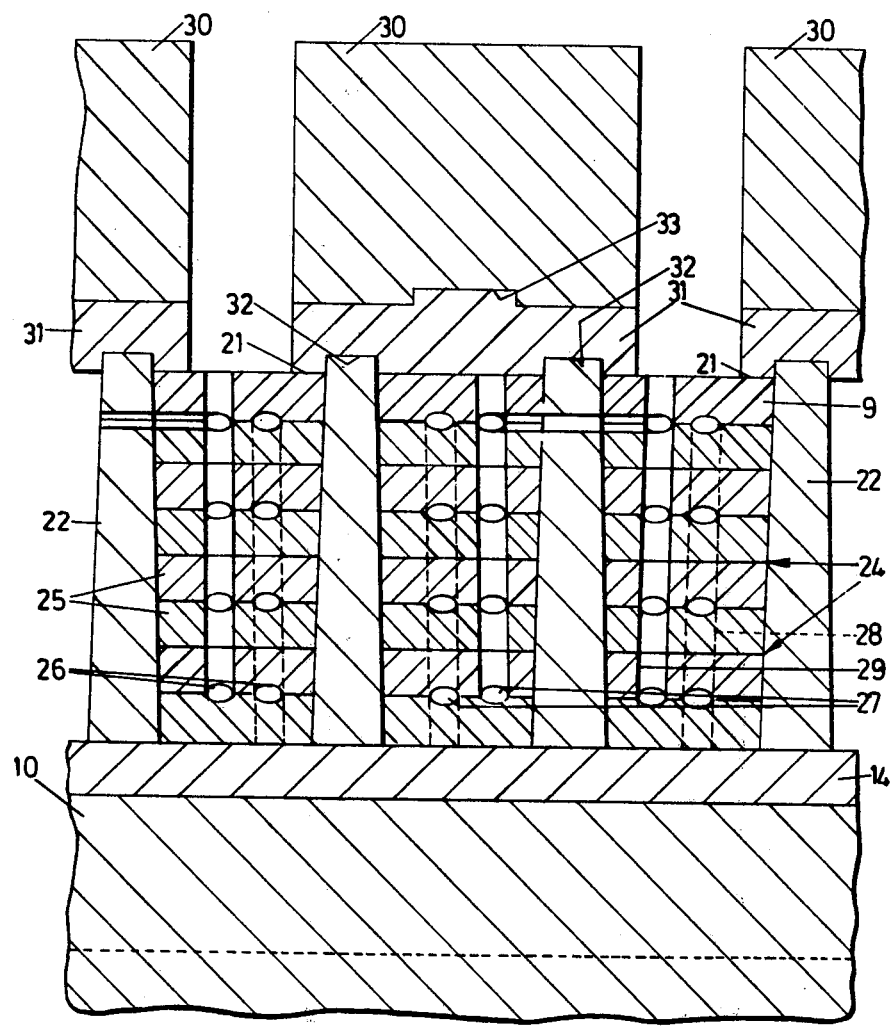
FIG. 3 is a fragmentary cross-section showing a group of circumferentially extending conductors of an end-winding shown in FIG. 1, but drawn to a larger scale that that figure.
Figure 4:
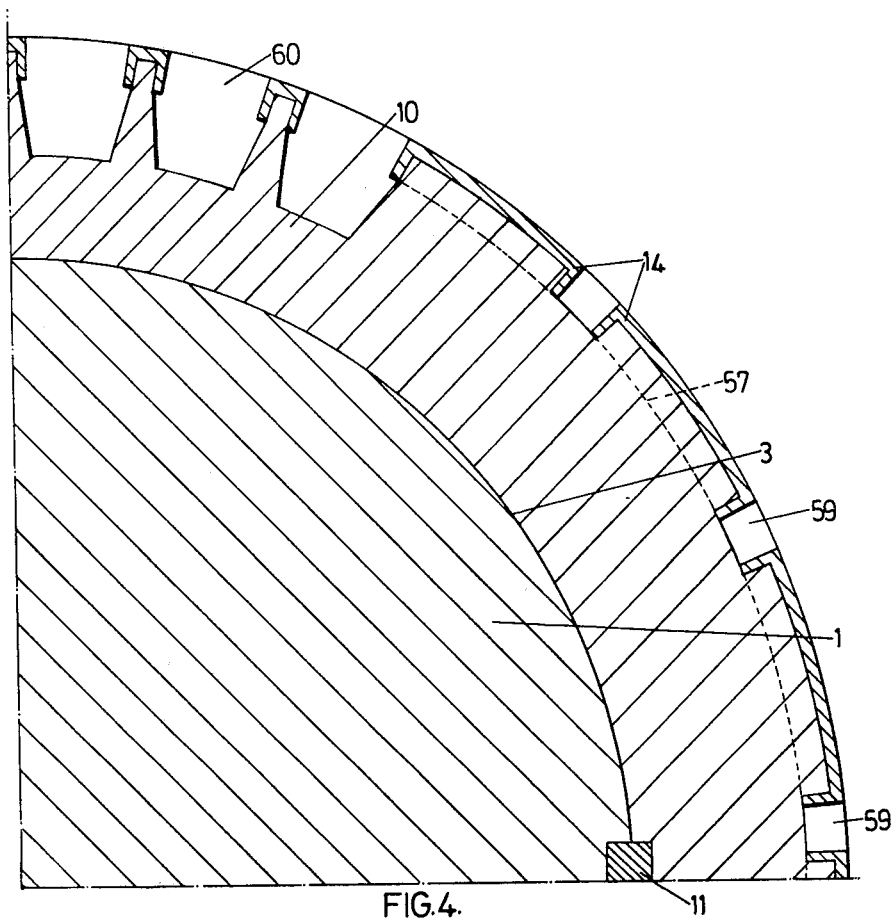
FIG. 4 is a transverse section of one quarter of an annular support member shown in FIG. 1, but drawn to a larger scale than that figure.

At each end of the rotor body 1, adjacent the overhang region 3 is an end-winding 8 comprising a multiplicity of conductors 9 which extend axially partway along the overhang region 3 and are arranged in groups as seen in FIG. 2 and are then bent round so that they extend circumferentially in groups as seen in FIG. 3. The conductors 9 of each end-winding 8 are supported by an annular support member 10 interposed between the overhang region 3 and the conductors 9 of the end-winding 8, and having an outer diameter substantially equal to that of the active region 2 of the rotor body 1. Each annular support member 10, which preferably is of non-magnetic material of low density such as aluminium alloy, is secured to the rotor body 1 by a key 11.

The axially extending portions of the conductors 9 of the end-windings 8 are separated into equal portions or blocks 12 by a plurality of insulating members or packing pieces 13 which are disposed axially along and abut radially onto the peripheries of a plurality of arcuate members 14 of insulating material secured at spaced positions around the circumference of the support member 10. The conductors 9 forming the axially extending portions of the end-winding 8 occupy twelve adjacent blocks 12 at each end of the quadrature axis. In the arrangement of axially extending conductors 9 shown in FIG. 2, each block 12 contains twelve conductors 9 in all, disposed in three vertical stacks of four conductors each. The three vertical stacks of conductors 9 are electrically insulated from each other by sheets 17 of insulating material interposed between the stacks, and the conductors 9 forming a vertical stack are electrically insulated from one another by thin strips 18 of insulating material interposed between the conductors 9. The conductors 9 are electrically insulated from the annular support members 10 by the arcuate members 14.

The circumferentially extending portions of the conductors 9 are separated into vertical stacks 21 (see FIG. 3), by a plurality of packing pieces 22 which abut onto the arcuate members 14 of insulating material secured at spaced positions around the circumference of the annular support member 10. The conductors 9 in each vertical stack 21 are electrically insulated from each other by sheets 24 of insulating material interposed between the conductors.

As can be seen in FIGS. 2 and 3, each conductor 9 is built up from two copper straps 25 each having two grooves 26 of semi-elliptical cross-section, the two straps 25 being stuck together so that the grooves 26 coincide to form ducts 27 of elliptical cross-section for conveying a gas coolant through the end winding 8. Holes 28 which extend radially through the seven radially inner straps 25 admit cooling gas to the ducts 27, and holes 29 which extend radially through the seven radially outer straps 25 convey cooling gas from the ducts 27.

The conductors 9 forming the end-winding 8 are constrained against the effects of centrifugal force by a plurality of annular members 30 which are prestressed to clamp the conductors 9 to the annular support member 10 so that no further stretching of the annular members 30 occurs at the maximum speed attained during overspeed testing of the rotor. The annular members 30, which are formed from strong fibres embedded in synthetic resin, constrain the conductors 9 so that they can withstand the severe centrifugal forces which are set up when the rotor is running at maximum speed and which may amount to 10,000 times the weight at rest of the end-winding 8.

Preferably the annular members 30 are prestressed in-situ on the end-winding 8 by inflatable bags 31 interposed between the annular members 30 and the conductors 9 forming the end-winding 8. The radially outer ends of the packing pieces 22 project into grooves 32 in the inflatable bags 31 to lock them in position on the circumferentially extending portions of the conductors 9, and grooves 33 in the annular members 30 receive projecting portions of the inflatable bags 31 to locate the annular members 30 on the inflatable bags 31. The inflatable bags 31 are provided with connectors 34 (see FIG. 5) through which a suitable fluid medium, such as a synthetic resin, may be injected into the bags 31 under pressure to prestress the annular members 30. The connectors 34 are housed in insulating blocks 35 which are inserted in the spaces between two adjacent annular members 30. The synthetic resin is then cured while under pressure to maintain the annular members in the prestressed condition. Typically the resin is injected at a pressure within the range 5,000 to 15,000 p.s.i. and is cured by heating to a high temperature.

Conveniently, the inflatable bags 31 comprise uniform tubes which are wider than the annular members 30 and which initially are bent outwards as shown in full line at positions 37 and 38, around the inner edges of the annular members 30. As the annular members 30 expand to the stretched positions during the injection of the resin the inflatable bags 31 unroll to the configuration shown in broken lines 39 without any rubbing action. The edges of the inflatable bags 31 are held close to the annular members 30 by the blocks 35 of densified plywood temporarily secured in place by external means (not shown).

Advantageously, the surfaces of the blocks 35 in contact with the inflatable bags 31 may be coated with a substance having a low coefficient of friction, such as polytetrafluoroethylene, to allow the blocks 35 to be withdrawn easily after the resin has set. A connector 34, through which the resin is injected, is attached to the inflatable bag 31 at a position reinforced locally by a rubber washer 40, by means of a flanged tube 41 inserted into the inflatable bag 31. The rubber washer 40 is initially compressed to form a seal by pressing the flanged tube 41 into the connector 34 until it is retained by a cylindrical spring 42 in a space 43. A tube 44 through which the resin is injected is attached to the connector by a nut 45 accommodated in a cavity 46 in one of the blocks 35. Preferably, all the bags are inflated simultaneously, and after the resin has set the blocks 35 are removed and the connector 34 sheared off at a notch 47.

Figure 6:
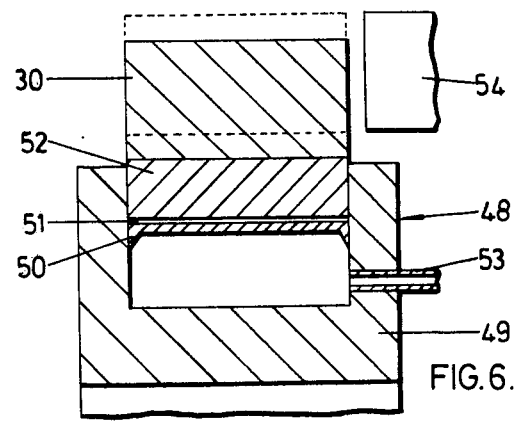
FIG. 6 is a sectional elevation of a hydraulically operated jacking device which can be used to fit annular members to a rotor end-winding.

Alternatively, as shown in FIG. 6, the annular members 30 can be prestressed by a hydraulically operated jacking device 48 before being fitted to the end-winding 8. The jacking device 48 comprises a strong steel annulus 49 fitted with a flexible oil seat 50 which is surrounded by a thin-walled cylinder 51 of glass-resin composite material and a ring of discrete steel blocks 52. To prestress an annular member 30 it is placed over the ring of blocks 52 and oil at a high pressure is pumped through an inlet tube 53 into the annulus 49 until the annular member 30 is stretched enough to provide the required prestressing. The annular member 30 is then forced into position over the end-winding 8 by a hydraulically operated ram 54. The radially inner surface of the annular member 30 or the radially outer surfaces of the conductors 9 of the end-winding 8 may be coated with a substance having a low coefficient of friction, such as polytetrafluoroethylene or molybdenum disulphide to reduce the force necessary to ram the annular member 30 on to the end-winding.

The end-winding is held axially by an annular packing 55 and a steel ring 56 secured to the annular support member 10 and carrying screws (not shown) which compress the packing 55 onto the end-winding 8. Ducts 57 which extend circumferentially around the annular support member 10 convey cooling gas to the axially extending conductors in the end-winding 8, and axially extending ducts 59 in the periphery of the annular support member 10 (see FIG. 4), convey the cooling gas to the entry holes 28 in the circumferentially extending conductors 9 of the end-winding 8. Further axially extending ducts 60 in the periphery of the annular support member 10 near the direct axis convey cooling gas to the active region 2 of the rotor body.

Referring now to FIGS. 7 to 12, the slot-less water-cooled rotor comprises a cylindrical rotor body 61 having an active region 62 which lies within a stator 63 of a dynamo-electric machine, and has at each end, an overhang region 64 which has a diameter smaller than that of the active region 62 and terminates in a shaft 65. Conveniently, the rotor body 61 may be formed by a one-piece steel forging. The active region 62 is provided with a winding 66 which comprises a multiplicity of conductors extending axially along its periphery and occupying substantially one third of the circumference of the rotor body 61 at each end of the quadrature axis. The conductors forming the winding 66 may be constrained against the effects of centrifugal force in the manner described in our aforesaid U.S. patent application.

At each end of the rotor body 61, adjacent the overhang region 64, is an end-winding 68 comprising a multiplicity of conductors 69 which extend axially partway along the overhang region 64 and then extend circumferentially. The conductors 69 of each end-winding 68 are supported by an annular support member 70 interposed between the overhang region 64 and the conductors 69 forming the end-winding 68, and having an outer diameter slightly less than that of the active region 62 of the rotor body 61. Each annular support member 70, which is preferably of non-magnetic material of low density such as aluminium alloy, is shrunk onto and keyed to the rotor body 61 so that most of the fitting pressure is developed near the active region 62 of the rotor body 61, and thermal expansion relative to the rotor steel can take place axially outwards.

The axially extending portions of the conductors 69 of the end-winding 68 on either side of the quadrature axis 71 are separated into equal portions or blocks 72 by two sets of packing pieces 73 and 74, both of slightly tapered cross-section which are disposed axially along and abut radially onto the outer peripheries of respective sleeves 75 and 76 of electrically insulating material coaxial with the support member 70. The packing pieces 73 and 74 are also of electrically insulating material.

The conductors 69, which are formed by copper tubes of substantially rectangular cross-section, have their axially extending portions arranged so that each block 72 contains twelve conductors 69 disposed in two layers, the radially inner layer of conductors 69 in a block 72 being electrically insulated from the annular support member 70 by the sleeve 75 and the radially outer layer of conductors being electrically insulated from the radially inner layer of conductors by the sleeve 76, the conductors in each layer being electrically insulated from each other by sheets 77 of insulating material.

Connections to the conductors 69 for the supply and discharge of cooling water are made by tubes such as 78 of tough steel which are brazed into connector pieces 79 which are themselves brazed into the conductors 69 at holes 80 drilled through their walls. In order to make room for the tubes 78 between the two layers of conductors 69, the radially inner layer is bent so as to lie nearer the rotor axis.

Figure 11:
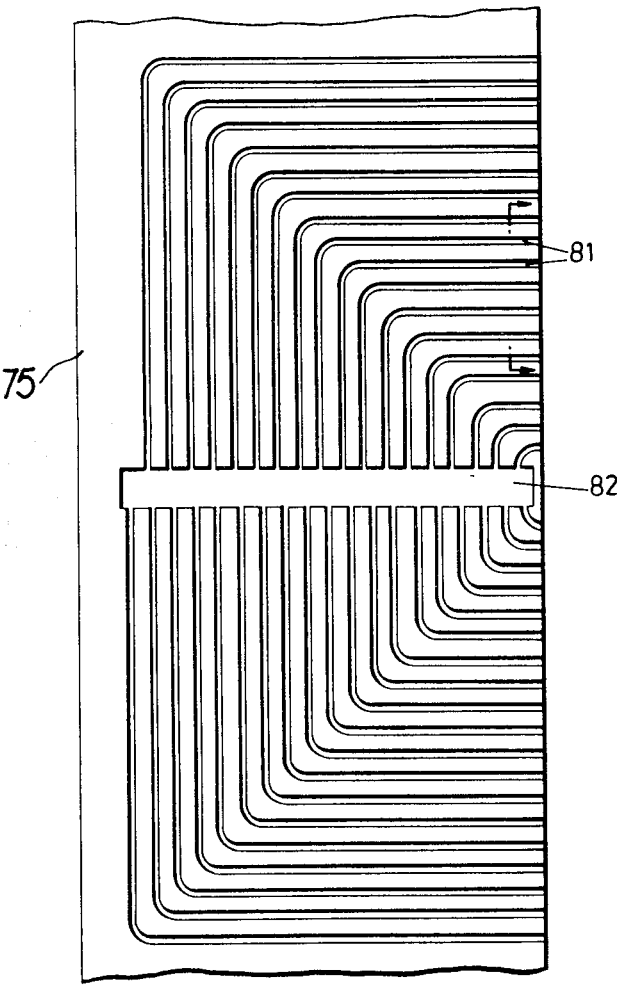
Figure 11:
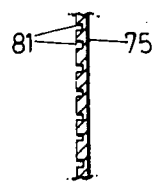
Figure 12:
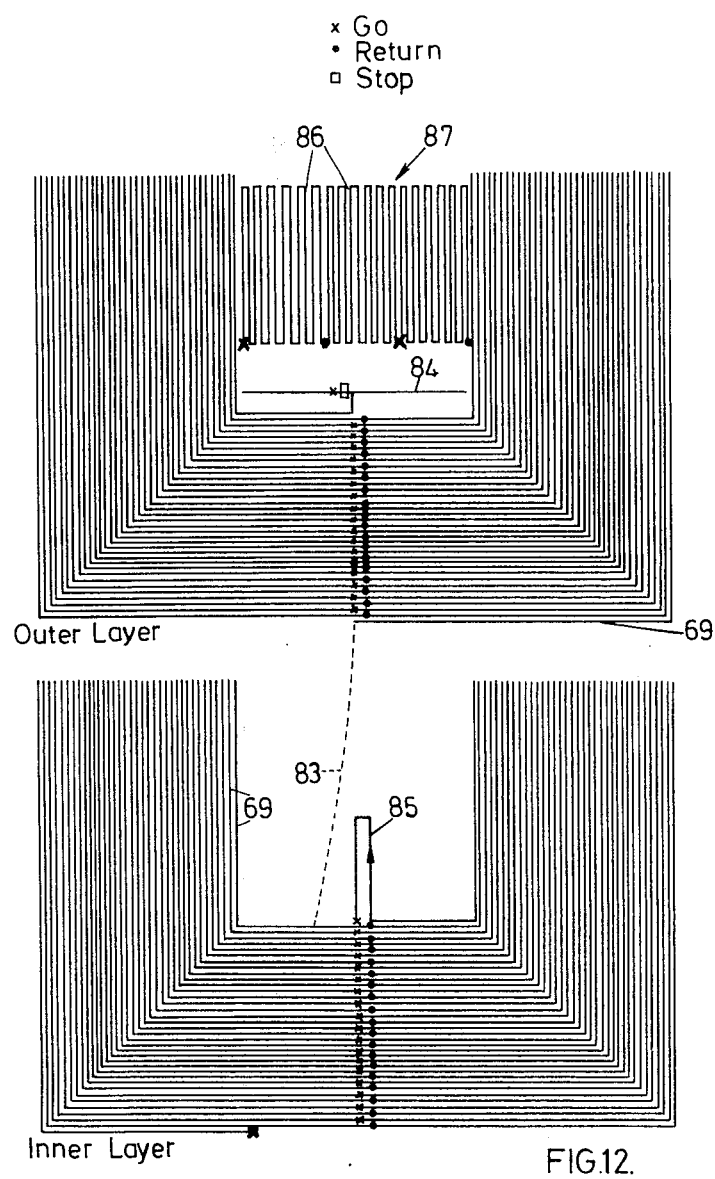

As illustrated schematically in FIG. 11, which is a view of about half of a sleeve 75 imagined to be opened out flat, with the active region of the rotor body to the left of the Figure, the sleeve 75 is provided with grooves 81 into which the tubes 78 are arranged to fit.

The connector pieces 79, which are positioned at one end or the other of the direct axis, lie in a further groove 82 provided in the sleeve 75. Packing (not shown) is glued between the tubes 78 and the conductors 69 during assembly. Similar grooves are provided in the sleeve 76 and further packing is fitted in a similar manner. Inter-connection between the two layers of conductors 69 is by a short radially extending connection piece 83 as shown schematically in FIG. 12. An inter-pole ring 84 fits within a groove in the insulating sleeve 76 and is cooled by water flowing half-way round before entering the inner turn, on either side of the quadrature axis. Connections to the slip-rings are made by loops 85 of copper tube, water flowing out to the slip-ring and back to the first turn on either side of the quadrature axis.

The six remaining blocks 72 at each end of the direct axis contain conductors 86 also formed by copper tubes of rectangular cross-section, which are electrically connected to the annular support members 70 at each end of the rotor body 61 to form a damper winding 87. Six such conductors 86 are arranged in each such block 72 and are disposed in a single radially outer layer, the radially inner part of each such block 72 being filled with a suitable packing material (not shown).

Figure 5:
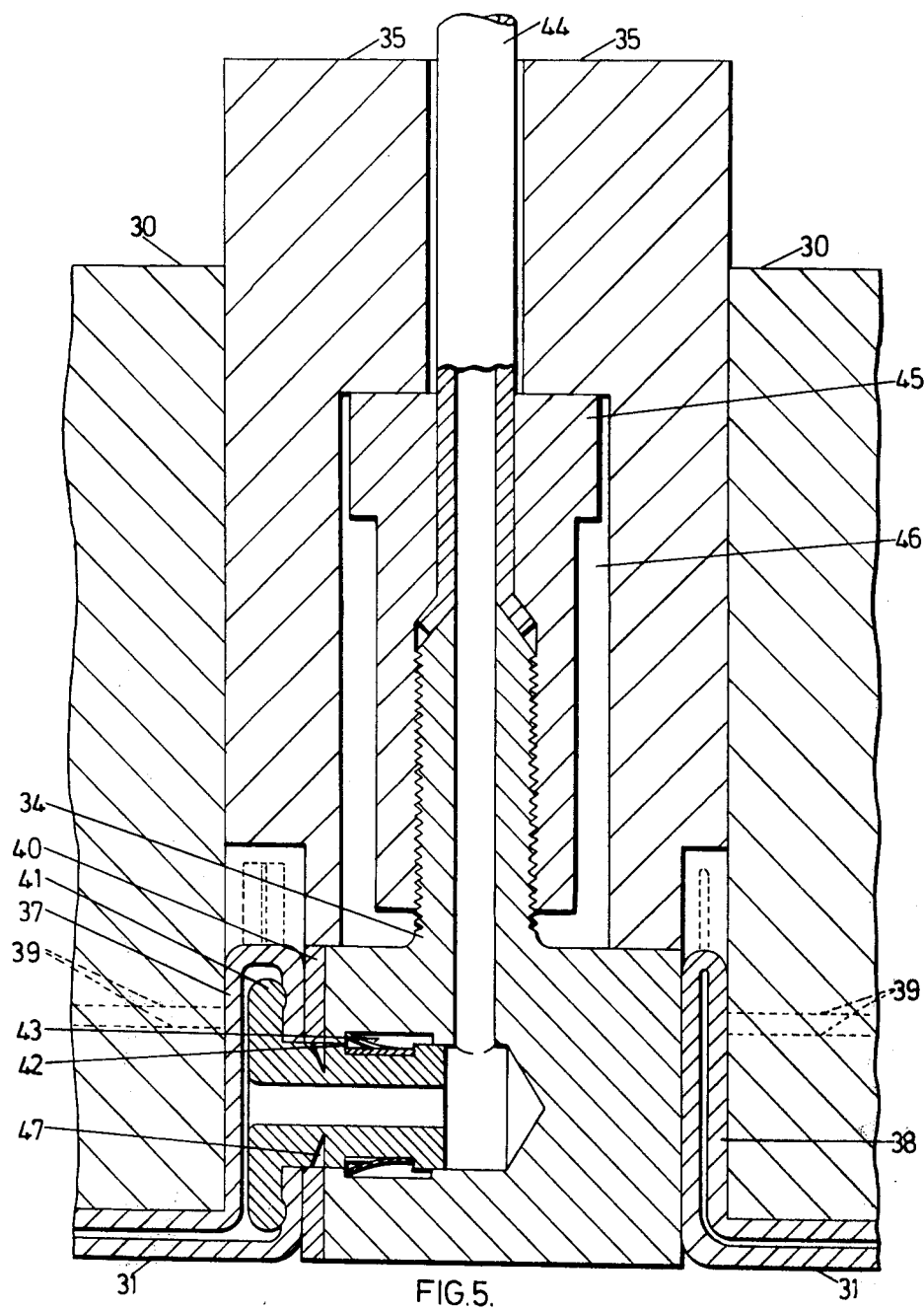
FIG. 5 is a fragmentary sectional elevation showing a connector for filling inflatable bags which are used to prestress annular members shown in FIG. 1.
Figure 7:
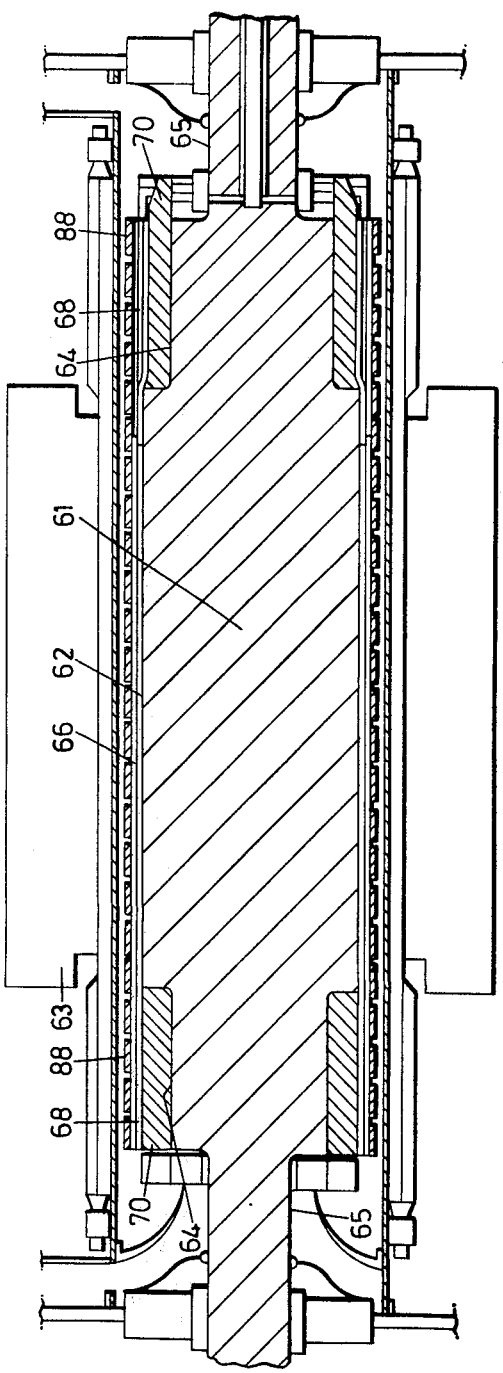
FIG. 7 is a sectional elevation of a water-cooled slotless rotor having end-windings supported in accordance with the invention.
Figure 8:
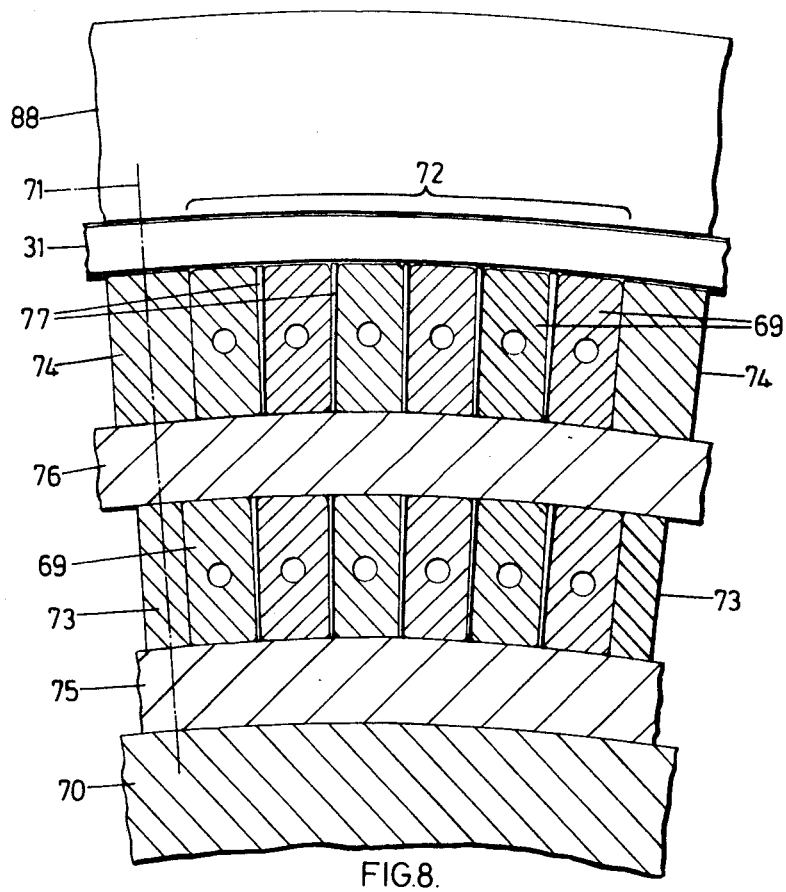
FIG. 8 is a fragmentary cross-section showing a group of axially extending conductors of an end-winding shown in FIG. 7, but drawn to a larger scale than that Figure.
Figure 9:
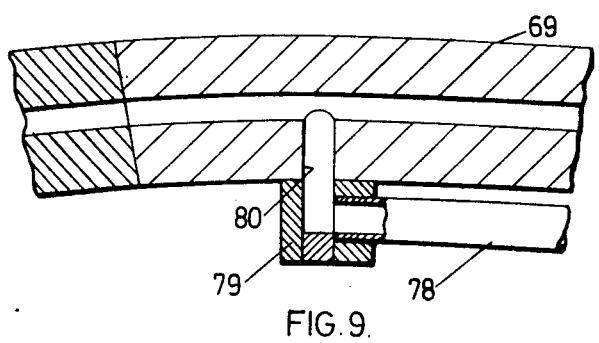
FIG. 9 is a fragmentary sectional elevation showing a connector for supplying cooling liquid to the conductors of an end-winding shown in FIG. 8.
Figure 10:
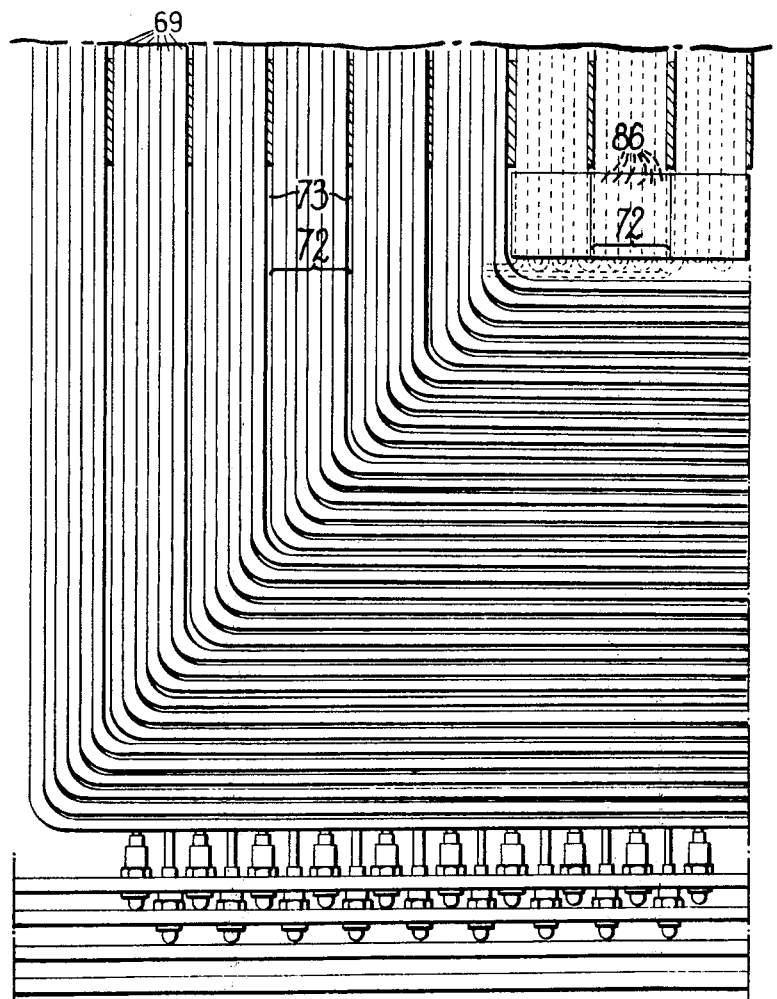
FIGS. 10 to 12 are schematic diagrams illustrating a scheme for supplying cooling liquid to the conductors of an end-winding.

The conductors 69 forming the end-winding 68 are constrained against the effects of centrifugal force by a plurality of annular members 88 which are prestressed to clamp the conductors 69 to the annular support members 70 so that no further stretching of the annular members 88 occurs at the maximum speed attained during overspeed testing of the rotor. The annular members 88, which are formed by strong fibres embedded in synthetic resin, constrain the conductors 69 so that they can withstand the severe centrifugal forces which are set up when the rotor is running at maximum speed. Preferably, the annular members 88 are prestressed in situ on the end-windings 68, using inflatable bags 31 as shown in FIG. 5 in the manner previously described. However, with the smaller temperature changes which occur with water cooling, stop members between the annular members 88 are not required. Alternatively, the annular members 88 may be prestressed using the hydraulically operated jacking device 48 shown in FIG. 6 in the manner previously described.

Although the embodiments of the invention described above are slot-less rotors it will readily be appreciated that the invention is suitable for supporting the end-windings of conventional rotors.

We claim:

1. A dynamo-electric machine comprising:
   a. a rotor body;
   b. an overhang region at an end of the rotor body;
   c. an end-winding including a multiplicity of conductors which extend axially along the overhang region;
   d. annular support means interposed between the said conductors of the end winding and the overhang region;
   e. a plurality of annular members encircling said conductors at spaced positions along the overhang region to constrain the conductors against the effects of centrifugal force; and
   f. at least one expansible device interposed between the encircling annular members and the conductors forming the end-winding, the expansible device being held in an expanded condition to prestress the annular members to a tensioned condition to clamp the conductors to the support means, and to an extent such that stretching of the annular members at the maximum speed of the rotor is substantially prevented.

2. A rotor as claimed in claim 1, wherein said expansible device comprises an inflatable container containing a medium which maintains the container in the inflated condition.

3. A rotor as claimed in claim 2, wherein the medium within the inflatable container is a solidified curable synthetic resin.

4. A rotor as claimed in claim 1, wherein the encircling annular members are formed from strong fibers embedded in synthetic resin.

5. A rotor as claimed in claim 1, wherein the annular support means comprises a single annular member secured around the overhang region of the rotor body.

6. A rotor as claimed in claim 1, wherein the annular support means comprises a plurality of separate members secured around the overhang region of the rotor body.

7. A rotor as claimed in claim 1, wherein the annular support means is formed from a non-magnetic metal of low density.

8. A rotor as claimed in claim 1, wherein the annular support means is formed from an aluminum alloy.

9. A rotor as claimed in claim 1, wherein the annular support means is formed from electrical insulating material.

10. A rotor as claimed in claim 1, wherein the annular support means is formed from a fiber-reinforced composite material.

11. A rotor as claimed in claim 1, wherein the axially extending portions of the conductors forming the end-winding are constrained against torque forces by a plurality of support members disposed axially along the annular support means and projecting from the periphery of the annular support means so that groups of axially extending conductors of the end-winding lie between two adjacent support members.

12. A rotor as claimed in claim 1, wherein the rotor is gas-cooled and the annular support means is provided with ducts through which the cooling gas is conveyed.

* * * * *